United States Patent [19]

Leibach et al.

[11] Patent Number: 5,520,375
[45] Date of Patent: May 28, 1996

[54] VIBRATION CANCELING DEVICE

[75] Inventors: Markus Leibach, Hemsbach; Georg Feurer, Mörlenbach, both of Germany

[73] Assignee: Firma Carl Freudenberg, Weinheim, Germany

[21] Appl. No.: 342,190

[22] Filed: Nov. 18, 1994

[30] Foreign Application Priority Data

Nov. 24, 1993 [DE] Germany ............... 43 40 034.5

[51] Int. Cl.$^6$ ................ B60K 5/12; F16F 15/02
[52] U.S. Cl. ....................... 267/140.14; 188/378
[58] Field of Search .................. 188/378, 379, 188/380; 267/140.14, 140.15; 364/508

[56] References Cited

U.S. PATENT DOCUMENTS

| | | | |
|---|---|---|---|
| 5,052,529 | 10/1991 | Sutcliffe et al. | 188/378 |
| 5,236,186 | 8/1993 | Weltin et al. | 188/378 |
| 5,238,232 | 8/1993 | Kobayashi et al. | 188/378 |
| 5,349,537 | 9/1994 | Burger et al. | 364/508 |
| 5,374,025 | 12/1994 | Whelpley et al. | 188/378 |

FOREIGN PATENT DOCUMENTS

| | | |
|---|---|---|
| 3433255 | 3/1986 | Germany. |
| 4104168 | 4/1992 | Germany. |
| 4123254 | 1/1993 | Germany. |

*Primary Examiner*—Matthew C. Graham

[57] ABSTRACT

A mount assembly for a vibrating component, which mount includes a supported mount supported on a machine part; a supporting mount supported via a spring element on the supported mount; and an inertial mass, movable back and forth by a drive in a direction parallel to the direction of the vibrations introduced during operation. The inertial mass is spring-mounted and is controllably movable in a direction opposite from the exciting vibration and is joined to the supported mount by a spring, such that the inertial mass and spring are not contacted by a liquid. A control system is used to control the movement of the inertial mass.

5 Claims, 2 Drawing Sheets

VIBRATION CANCELING DEVICE

BACKGROUND OF THE INVENTION

1. Field of the Invention

The present invention relates to a mount assembly for a vibrating component. The invention includes a supported mount supported on a machine part, a supporting mount supported via a spring element on the supported mount, and an inertial mass. The inertial mass is reciprocable by a drive in a direction parallel to the direction of the vibrations introduced during operation of the vibrating component. The inertial mass is spring-mounted and is controllably movable in a direction opposite from the exciting vibration, and is joined to the supported mount by a spring. The mount assembly is connected to a control system for ensuring that the inertial mass vibrates opposite from the exciting vibration, to thereby reduce the vibrations of the vibrating component.

2. Description of the Prior Art

A mount assembly is shown in German Patent 34 33 255. This patent describes a vibration-damping mount whose damping device and compensation membrane are actively influenced. An actuator is acted upon by a control unit including a computer, in order to achieve compensation for pressure changes in the damper fluid caused by interference vibrations of the vibrating body. The computer receives a reference input signal detected with a signal transducer. The reference input signal can be, for example, the engine speed as well as at least one further signal characterizing the state of the vibrating body. The computer is fully programmable as a function of the reference input variable. In and of itself, a control system of this kind creates an ability to compensate for all vibration body-related interference vibrations that occur. However, completely new programming for the computer is needed for each application, which is undesirable and laborious, especially when used in vehicles with different bodywork and equipment. It is not possible in the device described in this patent to detect airborne sound components. However, the spectrum of all possible interference vibrations—and those that actually occur—as a result of real-world driving is insufficiently covered by this device. In addition, utilization of control data, calculated at great effort and stored in the computer, is advisable only so long as there are no secondary changes in the system. For example, a change in the weight of the supported masses and/or an age-related change in the elasticity of the rubber components within the rubber mount cannot be compensated for.

German Patent No. 41 04 168 shows a hydraulically damped rubber mount that is used to support a mechanical accessory, which movies in vibratory fashion on a support, in which a fluid-filled working space is associated with an actuator provided with an electromagnetic drive. The drive has a triggering system that is joined in a signal-carrying manner, to a first signal transducer on the mechanical accessory. The triggering system includes a signal generator, a characteristics diagram control system, and a power amplifier as the output stage. The actuator is provided with an electromagnetic drive with which, when vibrations are introduced into the upper part of the rubber mount, pressure changes excited in the fluid-filled working space can be compensated for in such a way that any transfer to the machine element is prevented. The hydraulic damping mount, including its control system, is used only in connection with vibrations that arise in the engine. Vibrations arising in other components are not detected. The complex configuration of the mount and the extensive circuit mechanism needed to control interference vibrations in this devices tend to raise costs of such a device.

German Published Application No. 41 23 254 shows a control system for active mount elements, in particular for mount elements used to mount engines in motor vehicles. This publication describes a control system for active mount elements, individual or arranged in groups, and in particular active mount elements for mounting engines in motor vehicles. Sensors in this device detect interference vibrations and vehicle-specific general parameters. These parameters may be, for example, the engine speed, a selected gear, throttle valve position, and the like. This control system uses a control circuit to process the signals from the sensor and one actuator each to act on the mount element or elements as a function of the output signal of the control circuit. The control circuit also refers back to a vehicle-specific characteristics diagram stored in memory. This characteristics diagram is created by trial and error, and from it—in conjunction with the variables detected by sensor—are generated signals that the control circuit helps to process. This characteristics diagram also accounts for airborne transmission parameters detectable by sensors, and for other variables that can be measured only with great effort. The complex circuit arrangement is disadvantageous; too much data is detected, so that a larger memory capacity must be present. This requirement results in increased costs. Details of the mount assembly of this device will not be discussed specifically.

SUMMARY OF THE INVENTION

The underlying object of the prevent invention is to provide a mount assembly in such a way that interference vibrations which occur can be optimally compensated for in their entirety.

The mount assembly according to the present invention is characterized by the fact that the inertial mass and the spring are not contacted by a liquid. The supported mount can consist of a simply configured rubber and/or metal mount, and has the advantage that a hydro-mount, with its complex configuration and handling, does not need to be used. A mount configured as a hydro-mount must always be brought into contact with the engine of a motor vehicle. The high temperature of the engine can have a disadvantageous effect on the operation of the hydro-mount. When the mount assembly according to the present invention is used, the supported mount, coupled to a controllable vibration canceler to compensate for interference vibrations, can be used for any vibrating component. Considered as vibrating components in the context of the present invention are not only the engine, but also the transmission, air-conditioning compressor, generator, or other assemblies such as the wheels of the vehicle. The vibration canceler can be not only applied to one specific point, but can, for example be fastened to auxiliary frames, to the frame rail, the engine, or to any desired point on the body. With the vibration canceler of the present invention, provision is made for the resonant frequency of the vibrating system consisting of the inertial mass and the spring element to be no greater than the frequency of the reciprocating movement. The inertial mass can be moved by a plunger coil fastened, in a manner incapable of relative movement, to the support plate. The spring element can be deformed by the plunger coil. The inertial mass consists of a pot magnet that at least partially concentrically surrounds the plunger coil radially on both the inside and outside, and is guided by a guideway parallel to the axis of the plunger coil. It is advantageous that when vibrations are introduced, the parallel guidance of parts which move with respect to one another, and an air gap—traversed by a magnetic field—that extends substantially parallel to the movement direction, act to maintain a consistent gap width. As a result, the vibration canceler has linear operating characteristics. The magnetic field extends radially in the air gap and thus produces no static preload on the spring element in the direction of the intended movement. Because the spring element is not statically loaded by the static magnetic force, the spring material does not experience permanent sagging, even after extended use. The vibration canceler makes possible active reduction of introduced vibrations. Furthermore, the vibration canceler can be deliberately caused to vibrate in order to modify the frequency and intensity of vibrations in the adjacent component. The vibration canceler, consisting of an inertial mass and a spring, is housed in a separate housing. The pot magnet, which consists of a magnet housing and a magnet, forms a mass that can move parallel to the axis of the plunger coil. The housing is fastened onto the side of the machine element facing away from the supported mount. When an alternating current is introduced into the plunger coil, a force is generated between the pot magnet and the support plate fastened to the machine element that presses against the inert mass of the pot magnet and against the machine element. In an embodiment of this kind, it is of significance that the plunger coil does not need to be fastened to the machine element by means of a separately attached retainer. To achieve good utilization characteristics over a long service life and to allow the vibration canceler to be used in a variety of installation positions, suspension in the form of a spring element, which holds the pot magnet in a defined spatial zero position, is provided between the support plate with forms the plunger coil support and the pot magnet. The guide guides the pot magnet with respect to the plunger coil so that even when transverse forces act on the pot magnet, no friction or force occurs between magnet and coil. The magnitude of the inertial mass of the pot magnet can have a ratio of between 1:100 and 1:1000 to the magnitude of the mass of the vibrating component. The spring element can be made of an elastomeric material. It is advantageous if the vibration canceler has few parts and is uncomplicated. The spring stiffness of the spring element can be controlled by suitable material selection, depending on the inertial mass of the pot magnet and the vibration being canceled.

For greatly improved isolation of the acoustic vibrations generated by the vibrating component, with respect to the machine element, the vibration canceler can be connected to a control circuit. Provision is made for a first signal transducer to be followed by a signal generator that generates two harmonic first signals, phase-shifted with respect to one another and with frequencies matching both each other and the vibrations of the vibrating component, and a second signal that reproduces the frequency in a characteristic manner. This second signal is conveyed to characteristic curve elements whose functional correlation is arbitrarily defined between input and output signals. The output signals of these characteristic curve elements are multiplied by the first signals of the sine-wave generator, and the resulting third signals are added in pairs. The resulting signals are then each multiplied by a fourth signal of a sensor that characteristically reproduces relative movements of the machine element. The resulting fifth signals are each conveyed to an arbitrarily defined transmission element that has low-pass behavior above an arbitrarily definable frequency. The resulting sixth signals are multiplied by the signals of the sine-wave generator and the resulting seventh signals are added to an eighth signal. This is amplified in a power amplifier and is used to actuate the vibration canceler. It has proven to be particularly advantageous if at least one of the sensors is followed by an analog/digital converter, and the power amplifier is preceded by an digital/analog converter. The result is that triggering of the vibration canceler can be implemented up to a very high level with the use of digital control components; the use of programmable components is especially advisable. In principle, the sine-wave generator, characteristic curve elements, summing elements, branching points, multipliers, transmission element, and power amplifier can be implemented entirely or partially using digital components. Implementation of the functions is user-selectable. Digital implementation of the characteristic curve elements is particularly advantageous; even complex functional relationships between the second signal of the sine-wave generator characterizing the frequency of the vibrations of the vibrating component and the output signals of the characteristic curve elements can be implemented. Such relationships can be defined, in part, as constants for particular frequency ranges, and stored in the form of a table. The control system can be flexibly adapted to different operating conditions for this kind of digital implementation. At times it is also necessary to provide analog low-pass filters upstream from the A/D converters in order to prevent aliasing effects, and to place a similar low-pass filter downstream from the A/D converter in order to smooth the stepped profile of the output signal and convey the resulting smoothed signal to the power amplifier. These additional filters must, if applicable, be accounted for in the functions implemented with the aid of the characteristic curve elements. Another goal is for the phase shift between the two first signals generated by the signal generator to be defined as a function of the second signal generated by the signal generator and characterizing the vibration frequency of the vibrating component. This can be achieved, for example, with the use of dead-time elements, analog or digital filters, shift registers, etc. With this circuit the vibration canceler of the present invention is controlled in such a way that only a very small number of calculation operations is required. The memory capacity required for implementation of the control system for the vibration canceler of the present invention is small. All that needs to be stored is the functional relationships, determined in a preliminary trial, which are implemented in the control circuit by means of the characteristic curve elements. The vibration canceler control system is suitable for very wide frequency ranges and is characterized by being particularly robust in terms of control engineering. Changes of large magnitude in the dynamic behavior of the power amplifier, vibration canceler, machine element, and sensor can be tolerated. The control system can react to rapid changes in the frequency of the vibrations being isolated, for example, frequency changes caused by changes in the rotation a speed of a vibrating component.

BRIEF DESCRIPTION OF THE DRAWINGS

An exemplary embodiment of the invention is explained in greater detail below with reference to drawings, in which.

DETAILED DESCRIPTION OF THE DRAWINGS

Figure 1:
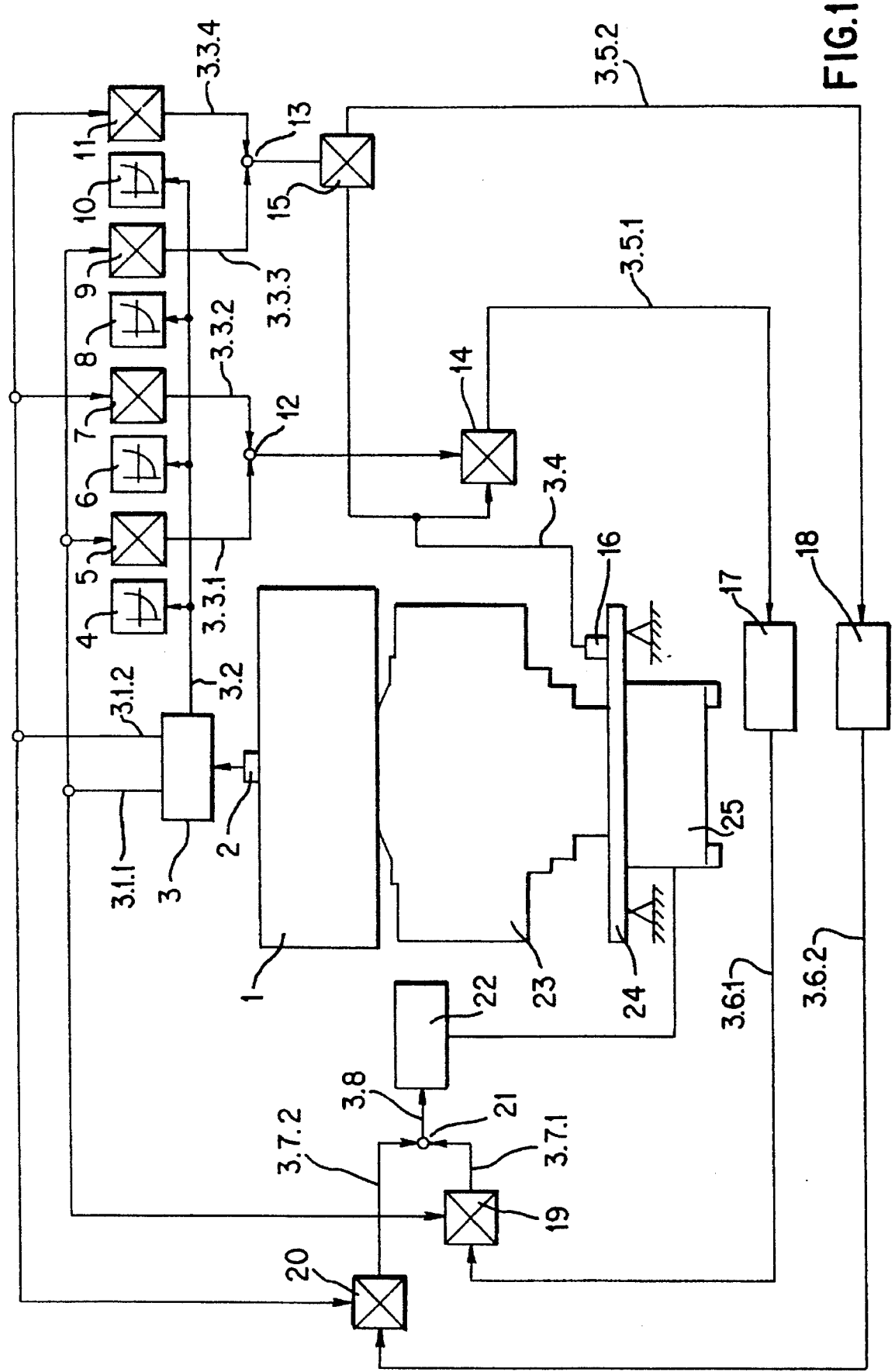
FIG. 1 shows the mount assembly according to the present invention, along with a block diagram of the control circuit.
Figure 2:
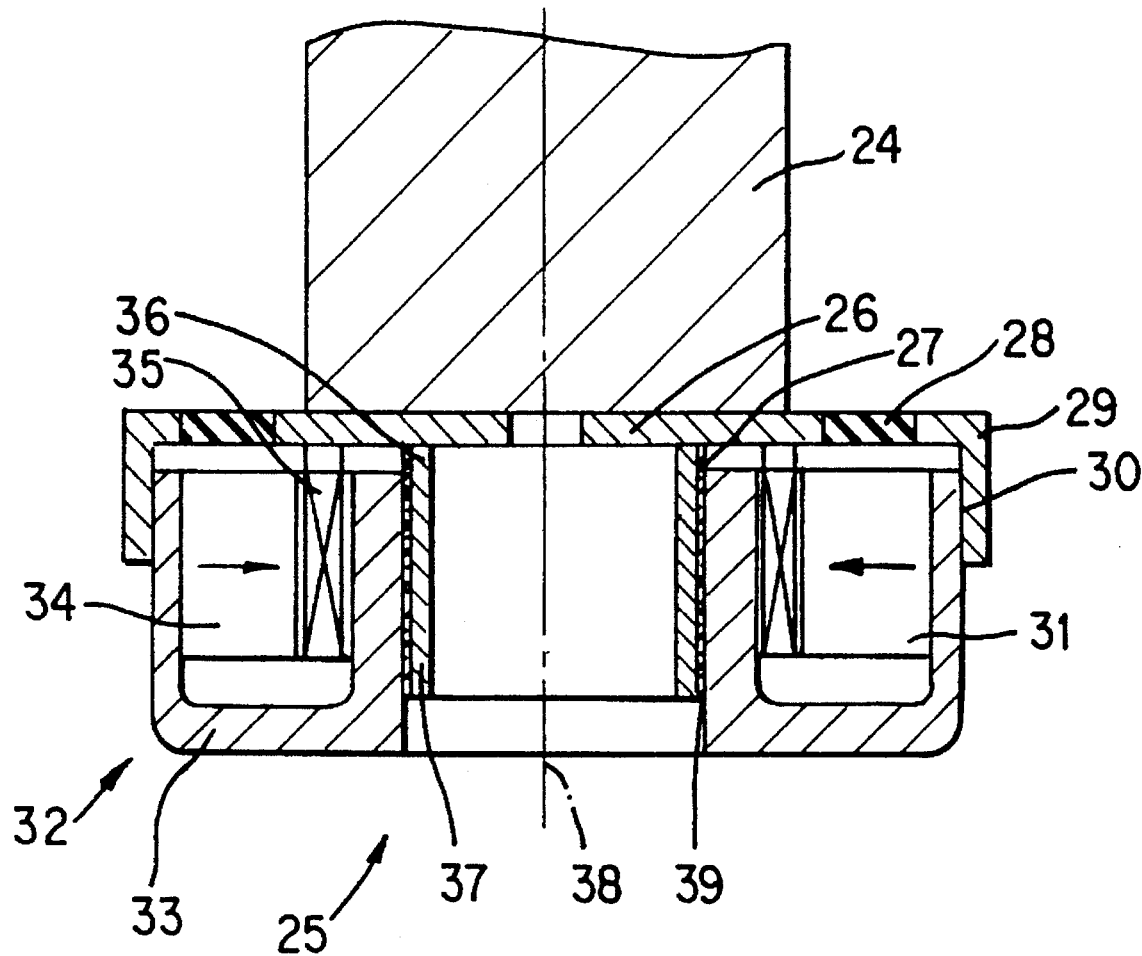
FIG. 2 shows the active vibration canceler in section.

FIG. 1 shows the mount assembly according to the present invention interacting with a control circuit. FIG. 2 shows the configuration of an active vibration canceler as utilized in the embodiment of FIG. 1.

The mount assembly for a vibrating component 1 comprises a supported mount 23 which is supported on a machine element 24, for example the body of an automobile. Supported mount 23 is coupled by means of a spring to the inertial mass of a vibration canceler 25. This vibratory system, consisting of inertial mass 32 and spring 28, is not contacted by a liquid. Supported mount 23 can consist of a simply constructed rubber and/or metal mount. The coupling of supported mount 23 to vibration canceler 25 provides compensation for all interference vibrations that occur for each vibrating component 1. Vibrating components 1 can be, for example, the engine, transmission, air-conditioning compressor, generator, or subassemblies such as the wheels of a vehicle. This means that the apparatus according to the present invention can be attached not only at one specific point on the vehicle, but at each point where vibrating components are located.

FIG. 2 shows a vibration canceler 25 that can be used with the present invention. FIG. 2 shows an active vibration canceler 25 that is fastened to a machine element 24 which can reciprocate. Vibration canceler 25 includes a support plate 26 that is joined to machine element 24. In the exemplary embodiment depicted in FIG. 2, machine part 24 and support plate 26 are bolted to one another. The inertial mass of vibration canceler 25 consists of a pot magnet 32. Pot magnet 32 is constructed of a magnet 34 and a magnet housing 33. The value of the mass of the inertial mass can be varied by changing the mass of magnet housing 33. By changing this mass, and by means of spring elements 28 which are also designed to be variable, the resonant frequency of vibration canceler 25 can be defined at a desired value. Pot magnet 32 encloses a plunger coil 35—radially on the inside by magnet housing 33, and radially on the outside by magnet 34. Plunger coil 35 is fastened to support plate 26 in a manner not allowing relative movement between the two. Plunger coil 35 is provided with an electrical connector (not depicted in FIG. 2) and can be acted upon by alternating current via a power-supply unit. Plunger coil 35 is arranged parallel to the movement direction of machine element 24. Pot magnet 32 is fastened so as to vibrate relative to support plate 26 through a spring element 28. The vibrations introduced into machine element 24 can be reduced or, by introducing a counter-vibration, canceled by energizing plunger coil 35. An alternating current is introduced into plunger coil 35 as a function of the vibration of machine element 24, resulting in a force between pot magnet 32 and support plate 26 that acts in the axial direction against the mutually adjacent parts, suspended for vibration with respect to one another. Pot magnet 32 consists of magnet housing 33 and magnet 34. Magnet 34 is configured as an annular magnet 31 magnetized in the radial direction (as shown by arrows in FIG. 1). Magnet housing 33 is joined in the region of its outer periphery, by a press fit 30, to edge region 29 of support plate 26. Support plate 26 and edge region 29 are joined together by a spring element 28 made of an elastomeric material. Pot magnet 32 is guided in the area of its inner periphery by an axial projection 37 that is tubular in shape and is fastened to support plate 26 in a manner not allowing relative movement. Projection 37 is provided in the area of its outer periphery with a friction-reducing surface coating 39, in order to improve the response behavior of vibration canceler 25 when alternating currents are introduced. Vibration canceler 25 allows the isolation of harmonic vibrations, such as those proceeding from a vibrating component 1 excited by imbalance. The frequency of harmonic imbalance vibrations has a consistent relationship to the rotation speed of a vibrating component 1, and can therefore be defined. A signal 3.8 whose frequency matches the frequency of the harmonic imbalance excitation must therefore be generated. This signal must be configured, in terms of magnitude and phase, in such a way that the desired vibration isolation is achieved if this signal 3.8 is delivered via a power amplifier 22 to vibration canceler 25. In the discussion below, it is assumed that vibrating component 1 is, for example, a four-cylinder engine. In this kind of engine there can occur vibrations whose frequency corresponds to twice the engine rotation speed.

Signal transducer 2 supplies a periodic time signal whose period has a fixed relationship to the period of the vibration being isolated. A signal transducer of this kind can, for example, produce signals in response to the movement of component 1. Under some conditions, interfering signal components must be filtered out. Another possibility is to use a sensor that emits a constant number of pulses for each rotation of a rotating component in component 1. One example of this type of sensor is referred to as an OT sensor, or top dead-center sensor. An OT sensor emits a signal when a particular piston of a reciprocating engine is located at the top dead center point. As a result, exactly one pulse is received for each crankshaft rotation.

Signal generator 3 receives the signal of signal from transducer 2 and generates two harmonic vibrations with different phases. The phase difference between these two harmonic vibrations can also be controlled as a function of frequency. The frequency of these harmonic vibrations is identical to the frequency of the vibration being isolated.

The output signals of the sine-wave generator are governed by the equations:

$$u_1(t) = \sin(\omega t)$$

$$u_2(t) = \sin(\omega t + \phi[\omega])$$

where $\omega$ is the angular frequency of the vibration being isolated. Signal $u_1(1)$ is transmitted on line 3.1.1 and signal $u_2(t)$ is transmitted on line 3.1.2.

The following special cases may occur:

$$\phi(\omega) = \text{constant} = 90° \quad (1)$$

so that $$u_1(t) = \sin(\omega t)$$

$$u_2(t) = \sin(\omega t + 90°) = \cos(\omega t)$$

or $$u_1(t) = \sin(\omega t) \quad (2)$$

$$u_2(t) = \sin(\omega t - \omega T) = \sin(\omega[t-T]) = u_1(t-T)$$

In this circumstance, the frequency-dependent phase angle is:

$$\phi(\omega) = -\omega T$$

where T is a suitable dead time.

Signal $u_2(t)$ is obtained by delaying $u_1(t)$ by an interval T. This is advisably accomplished digitally. If T represents an integral multiple of the sampling time interval, this delay in $u_1(t)$ can be implemented easily using a shift register. This arrangement can be applied, in particular, when the operating speed range of the machine is limited.

To implement the control system of vibration canceler 24, $\phi(\omega)$ must not be an integral multiple of 180°, and must not be equal to zero, such that $u_1(t) \ne u_2(t)$.

The signal generator also generates a signal that characterizes the frequency of the imbalance of the imbalance-excited machine. This signal can, for example, be directly proportional to the frequency or period of the corresponding vibration.

The components of signal generator 3 can be, for example:

PLL (phase locked loop) circuits;

Tracking filters; and

Digital oscillators.

Output signal $u_1(t)$ of signal generator 3 is changed using output signal $r_1(t)$ of transmission element 17, utilizing a multiplier 19; output signal $u_2(t)$ of signal generator 3 is changed using output signal $r_2(t)$ of transmission element 18, utilizing multiplier 20. These changes yield the following signals:

$$v_1(t) = r_1(t) \cdot u_1(t) = r_1(t) \cdot \sin(\omega t)$$

$$v_2(t) = r_2(t) \cdot u_2(t) = r_2(t) \cdot \sin(\omega t + \phi[\omega])$$

i.e., a linear amplitude modulation is performed, where $\omega$ represents the angular frequency of the imbalance excitation or the frequency of the vibrations of the machine element 24.

Signals $v_1(t)$ and $v_2(t)$ are summed using a summer 21, and the result, signal $x(t)$, is delivered to power amplifier 22. This triggers vibration canceler 25 and causes movement of machine element 24. This movement of machine element 24 caused by vibration canceler 25 is superimposed over the movement caused by the imbalance of vibrating component 1. The total movement of vibrating component 1 and vibration canceler 25 is detected by signal transducer 16.

Hereinafter, it will be assumed that power amplifier 22, vibration canceler 25, machine element 24, and signal transducer 2 have linear characteristics. Hereinafter, these mutually connected elements will be referred to as the "subsystem."

When the linear subsystem is in the steady-state condition, the harmonic input signal of power amplifier 22 is:

$$x(t) = r_1(t) \cdot \sin(\omega t) + r_2(t) \cdot \sin(\omega t + \phi[\omega])$$

This signal generates, at the output of sensor 16, the harmonic output signal $g(t)$:

$$g(t) = r_1(t) \cdot |G[j\omega]| \cdot \sin\{\omega t + \arg(G[j\omega])\} + r_2(t) \cdot |G[j\omega]| \cdot \sin\{\omega t + \phi(\omega) + \arg(G[j\omega])\}$$

with a different amplitude $|G(j\omega)|$ and phase $\arg[G(j\omega)]$, where $G(j\omega)$ is the actuation transfer function between amplifier input 22 and sensor output 16, and $r_1(t)$ and $r_2(t)$ are amplitudes to be defined as appropriate.

In addition, a harmonic movement of component 1 generates, at signal transducer 16, the harmonic signal:

$$z(t) = Z(t) \cdot \sin(\omega t + \gamma[\omega])$$

The amplitude $Z(t)$ and phase $\gamma(\omega)$ of this signal are influenced by the imbalance forces of the vibrating component 1 and by the dynamic characteristics of component 1.

For purposes of simplification, it will be assumed hereinafter that only periodic signals occur. Thus the movement of machine element 24 characterized by sensor signal $s(t)$ at line 3.4, together with the effect on the signal at the power amplifier input $x(t)$ can be described by $$\begin{aligned} s(t) = \; & r_1(t)|G[j\omega]|\sin\{\omega t + \arg(G[j\omega])\} + \\ & r_2(t)|G[j\omega]|\sin\{\omega t + \phi(\omega) + \arg(G([\omega])\} + \\ & Z(t) \cdot \sin(\omega t + \gamma[\omega]) \end{aligned}$$

Amplitudes $r_1(t)$ and $r_2(t)$ need to be adapted so that the movement of machine element 24, characterized by sensor signal $s(t)$, can be minimized quickly. To achieve this result, it is necessary in the method of the present invention to determine the actuation transfer function of the subsystem by a preliminary trial.

The empirically measured transfer function $Gm[j\omega]$ between power amplifier input 22 and sensor 16 output is split into magnitude $|Gm[j\omega]|$ and phase $\arg(Gm[j\omega])$, which components are used to define the following characteristic curves:

$$a(\omega) = \frac{1}{|Gm[j\omega]|} \cdot \cos\{\arg(Gm[j\omega])\} - \frac{\cos(\phi[\omega])}{\sin(\phi[\omega])} \cdot \arg(Gm[j\omega])$$

$$b(\omega) = \frac{1}{|Gm[j\omega]|} \cdot \frac{\sin\{\arg(G[j\omega])\}}{\sin(\phi[\omega])}$$

$$c(\omega) = \frac{1}{|Gm(j\omega)|} \cdot \cos\{\phi[\omega] + \arg(Gm[j\omega])\} -$$

$$\frac{1}{|Gm(j\omega)|} \cdot \frac{\cos(\phi[\omega])}{\sin(\phi[\omega])} \cdot \sin\{\phi[\omega] + \arg(Gm[j\omega])\}$$

$$d(\omega) = \frac{1}{|Gm[j\omega]|} \cdot \frac{\sin\{\phi[\omega] + \arg(Gm[j\omega])\}}{\sin(\phi[\omega])}$$

The range of values for $\omega$ is governed by the frequency range of the vibrations of vibrating component 1.

The signal of signal generator 3, which is responsive to the frequency of the machine vibrations, as described above, is delivered to characteristic curve elements 4, 6, 8, and 10 on line 3.2.

The output signals of characteristic curve elements 4, 6, 8, and 10 are $a(\omega)$, $b(\omega)$, $c(\omega)$, and $d(\omega)$, as defined above.

Signal $u_1(t)$ and $a(\omega)$ are delivered to multiplication element 5, which produces the product of the two signals. Multiplication element 7 produces the product of $u_2(t)$ and $b(\omega)$. The two resulting products are added using summer 12.

The resulting signal $t_1(t)$ can be described by the equation:

$$\begin{aligned} t_1(t) &= a(\omega) \cdot u_1(t) + b(\omega) \cdot u_2(t) \\ &= a(\omega) \cdot \sin(\omega t) + b(\omega) \cdot \sin(\omega t + \phi) \\ &= \frac{1}{|Gm[j\omega]|} \cdot \sin\{\omega t + \arg(Gm[j\omega])\} \end{aligned}$$

Signal $t_2(t)$ is generated in a corresponding fashion using characteristic curve elements 8 and 10, multipliers 9 and 11, and summer 13:

$$\begin{aligned} t_2(t) &= c(\omega) \cdot u_1(t) + d(\omega) \cdot u_2(t) \\ &= c(\omega) \cdot \sin(\omega t) + d(\omega) \cdot \sin(\omega t + \phi) \\ &= \frac{1}{|Gm[j\omega]|} \cdot \sin\{\omega t + \phi[\omega] + \arg(Gm[j\omega])\} \end{aligned}$$

Signal $t_1(t)$ is multiplied by output signal $s(t)$ of signal transducer 16 using a multiplier 14 and transmitted on line 3.5.1. A further multiplier 15 forms the product of $t_2(t)$ and output signal $s(t)$ of signal transducer 16, which product is transmitted on line 3.5.2. Assuming that:

$$\sin(x) \cdot \sin(y) = 0.5(\cos[x-y] - \cos[x+y])$$

and $G(j\omega) = Gm(j\omega)$ then:

$s(t) \cdot t_1(t) = r_1(t) \cdot 0.5(1 - \cos\{2\omega t + 2\arg(G[j\omega])\}) +$ $\qquad r_2(t) \cdot 0.5(\cos(\phi[\omega]) - \cos\{2\omega t + 2\arg(G[j\omega]) + \phi[\omega]\}) +$ $\qquad \dfrac{Z(t)}{|Gm[j\omega]|} \cdot 0.5 \cdot \cos\{\gamma[\omega] -$ $\qquad\qquad \arg(G[j\omega])\} - \cos\{2\omega t + \gamma[\omega] + \arg(G[j\omega])\}$ In addition:

$s(t) \cdot t_2(t) = r_1(t) \cdot 0.5 \, (\cos(-\phi[\omega]) - \cos\{2\omega t + 2\arg(G[j\omega])\}) +$ $\qquad r_2(t) \cdot 0.5(1 - \cos\{2\omega t + 2\arg(G[j\omega]) + \phi[\omega]\}) +$ $\qquad \dfrac{Z(t)}{|Gm[j\omega]|} \cdot 0.5 \cdot \cos\{\gamma[\omega] - \phi[\omega] - \arg(G[j\omega])\} -$ $\qquad\qquad \cos\{2\omega t + \gamma[\omega] + \arg(G[j\omega])\}$ Signal $s(t) \cdot t_1(t)$ is conveyed to transmission element 17 on line 3.5.1, and signal $s(t) \cdot t_2(t)$ to transmission element 18 on line 3.5.2.

Amplitudes $r_1(t)$ and $r_2(t)$ are calculated in transmission elements 17, 18. It is important that only low level or weak signals with frequency $2\omega$ be contained in the output signals of the transmission elements 17, 18. To ensure this, in a first step these signal components can be strongly attenuated by low-pass filters in transmission elements 17, 18. After this low-pass filtration, known control algorithms can then be applied to the resulting signals. It is also possible first to apply this kind of control algorithm to $t_1(t)$ and $t_2(t)$, and then to perform low-pass filtration, or to utilize a control algorithm that itself possesses the desired low-pass characteristics. The latter condition can be met, in some circumstances, by a controller that has only one integral component.

In the functional description that follows, low-pass filtration will be performed first, and then a suitable control algorithm will be applied.

The cutoff frequency of the low-pass filter is defined so that harmonic signals with a frequency $2\omega$ are strongly attenuated and thus can be ignored in subsequent discussion; however the cutoff frequency must not be set too low in order to retain good dynamics for the overall system.

The signals $r_1(t)$, $r_2(t)$, and $Z(t)$ are influenced very little by low-pass filtration, since they represent relatively slow signals. The effect of low-pass filtration is indicated by a prime (').

Once low-pass filtration has been performed on signals $s(t) \cdot t_1(t)$ and $s(t) \cdot t_2(t)$, the following signals are present:

$e_1(t) = 0.5 \, \{r_1(t)' +$ $\qquad r_2(t)' \cdot \cos(\phi[\omega])\} + \dfrac{Z(t)'}{|Gm[j\omega]|} \cdot \cos\{\gamma(\omega) - \arg(G[j\omega])\}$ and $e_2(t) = 0.5\{r_1(t)' \cdot \cos(-\phi[\omega]) + r_2(t)'\} +$ $\qquad \dfrac{Z(t)'}{|Gm[j\omega]|} \cdot \cos\{\gamma[\omega] - \phi[\omega] - \arg(G[j\omega])\}$ These equations show that the control input signals $e_1(t)$, $e_2(t)$ each depend on $r_1(t)'$ and $r_2(t)'$. These are therefore coupled control loops. Coupling is absent when $\phi(\omega) = $ constant $= 90°$. The coupling is most pronounced when $\cos(\phi[\omega])$ has high values, i.e., when $\phi[\omega]$ is small (in the vicinity of integral multiples of $180°$). More detailed experiments have shown that the coupling terms influence the dynamics of the overall system, but functionality is guaranteed.

The above equations were derived using the assumption that the measured frequency response $G_m(j\omega)$ and the actual frequency response $G(j\omega)$ are approximately equal. This assumption can be confirmed by appropriate measurements. It was also assumed that initial transient phenomena could be ignored. This criterion is met in many cases when the variables in question change continuously, i.e., when sudden changes do not occur in actual practice.

A closer examination of the equations above shows that at constant frequency, $e_1(t)$ is directly proportional to $r_1(t)$ and $r_2(t)$. The correlation of $e_1(t)$ to $r_1(t)$ and $r_2(t)$ is influenced only by the angle $\phi(\omega)$. In this connection there is no correlation with frequency response $G(j\omega)$. The same applies to the correlation of $e_2(t)$ to $r_1(t)$ and $r_2(t)$.

The dynamics of the overall system is substantially determined by low-pass filtration, the control algorithm, and the phase difference $\phi(\omega)$. The influence of frequency response $G(j\omega)$ on the dynamics of the overall system is negligible.

The correlation between signals $e_1(t)$ and $e_2(t)$ and the controller outputs $r_1(t)$ and $r_2(t)$ is defined by the control algorithm. In practical tests, PI (proportional-integral) controllers with the following characteristics:

$$r_1(t) = k_p \cdot e_1(t) + \dfrac{k_p}{T_r} \cdot \int_0^t e_1(t')dt'$$

and $$r_2(t) = k_p \cdot e_2(t) + \dfrac{k_p}{T_r} \cdot \int_0^t e_1(t')dt'$$

where $k_p$ is the amplification factor and $T_r$ the integration time constant of the controller, have proven successful.

The dynamic behavior of vibration canceler 25, power amplifier 22, signal transducer 2, and machine element 24 can be influenced by environmental factors. It is possible to account for such factors by expanding the characteristic curves into characteristics diagrams, in which the variables which influence dynamic behavior represent additional input variables for the characteristics diagram control system. These additional input variables are determined with the use of sensors, and the additional input signals obtained in this manner are delivered to the characteristics diagrams. Such signals can be detected on machine element 24 in particular, so that the effects on the dynamic behavior of this component can be accounted for. The transmission element can have low-pass characteristics above an arbitrarily definable cutoff frequency, this cutoff frequency being continuously slaved to the frequency of the vibration of component 1 that needs to be suppressed. This results in a further improvement in the dynamic behavior of the overall system.

If it is possible to describe the vibrations of component 1 completely or partially by means of a combination of two or more harmonic vibrations, the circuit can be expanded in such a way that all harmonic vibrations are isolated. To do so, additional signal generators are placed downstream from the signal transducer. Each of these signal generators generates two first signals, phase-shifted with respect to one another, whose frequency is identical to a frequency of a vibration component of the machine vibrations. In addition, each signal generator generates a second signal that reproduces the respective generated frequency in a characterizing manner.

Located downstream from each of these signal generators are characteristic curve elements 4, 6, 8, 10, multipliers 5, 7, 9, 11, 14, 15, 19, 20, transmission elements 17, 18, and summers 12, 13.

Each of these multipliers 14 and 15 is connected in signal-carrying fashion to sensor 16.

The output signals of multipliers 19 and 20 are connected in signal-carrying fashion to additionally inserted inputs of summer 21.

In summary, this means when multiple vibration components of different frequencies are isolated simultaneously, the circuit is expanded a corresponding number of times, sensor 16, summer 21, and power amplifier 22 being used in common by the resulting loops.

We claim:

1. A vibration canceler for canceling vibrations of a vibrating component, the vibration canceling mount comprising:

a spring element having first and second sides;

an inertial mass attached to the first side of the spring element in a manner that permits oscillatory motion of the inertial mass, said second side of said spring element being connected to said vibrating component;

an actuator for causing controlled oscillatory movement of the inertial mass, said actuator imparting a force to said inertial mass to thereby vibrate said inertial mass, vibration of said inertial mass thereby vibrating said spring element, vibration of said spring element thereby vibrating said vibrating component;

wherein the inertial mass and the spring are not contacted by a liquid;

a first transducer for producing a first transducer signal having a signal frequency corresponding to a vibrational frequency of the vibrating component;

a signal generator coupled to the transducer, the signal generator producing at least two phase-shifted harmonic signals having harmonic signal frequencies equal to the vibrational frequency;

at least two curve generators, the at least two curve generators being coupled to the at least two phase-shifted harmonic signals;

a second transducer for producing a second transducer signal corresponding to vibration of the vibration canceler and the vibrating component; and at least one transmission element comprising a low pass filter, the transmission element being coupled to the second transducer and the at least two curve generators, the at least one transmission element being coupled to the actuator.

2. The vibration canceler of claim 1, wherein:

the inertial mass comprises a magnet and a housing for the magnet.

3. The vibration canceler of claim 1, wherein:

the actuator comprises a coil.

4. The vibration canceler of claim 1, wherein:

the inertial mass comprises an annular magnet.

5. The vibration canceler of claim 1, further comprising:

an analog-to-digital converter located downstream of the first transducer and a digital-to-analog converter located upstream of the actuator.

* * * * *